United States Patent
Pitkänen et al.

(10) Patent No.: US 10,066,874 B2
(45) Date of Patent: Sep. 4, 2018

(54) PLATE HEAT EXCHANGER AND METHOD FOR CONSTRUCTING MULTIPLE PASSES IN THE PLATE HEAT EXCHANGER

(71) Applicant: VAHTERUS OY, Kalanti (FI)

(72) Inventors: Paavo Pitkänen, Uusikaupunki (FI); Jyrki Sonninen, Raisio (FI); Piia Gustafsson, Rauma (FI)

(73) Assignee: VAHTERUS OY, Kalanti (FI)

( * ) Notice: Subject to any disclaimer, the term of this patent is extended or adjusted under 35 U.S.C. 154(b) by 230 days.

(21) Appl. No.: 14/781,410

(22) PCT Filed: Feb. 7, 2014

(86) PCT No.: PCT/FI2014/050089
§ 371 (c)(1),
(2) Date: Sep. 30, 2015

(87) PCT Pub. No.: WO2014/162041
PCT Pub. Date: Oct. 9, 2014

(65) Prior Publication Data
US 2016/0025419 A1    Jan. 28, 2016

(30) Foreign Application Priority Data
Apr. 4, 2013    (FI) .................................... 20135320

(51) Int. Cl.
*F28F 9/22* (2006.01)
*F28F 3/10* (2006.01)
(Continued)

(52) U.S. Cl.
CPC ............ *F28D 9/0093* (2013.01); *B23P 15/26* (2013.01); *F28D 9/0006* (2013.01); *F28D 9/0012* (2013.01); *F28D 9/0043* (2013.01)

(58) Field of Classification Search
CPC .. F28F 9/22; F28F 2009/222; F28F 2009/224; F28F 2009/226; F28F 3/10;
(Continued)

(56) References Cited

U.S. PATENT DOCUMENTS 1,722,109 A * 7/1929 Potter ................... F28F 9/0219
165/160
3,151,674 A * 10/1964 Heller ....................... F28F 9/02
165/158
(Continued)

FOREIGN PATENT DOCUMENTS

CN    1447898    10/2003
CN    101071046    11/2007
(Continued)

OTHER PUBLICATIONS

CN Office Action and Search Report regarding CN Appln No. 201480019601.5 (with English translation) dated Dec. 2, 2016.
(Continued)

*Primary Examiner* — Grant Moubry
*Assistant Examiner* — For K Ling
(74) *Attorney, Agent, or Firm* — Nixon & Vanderhye P.C.

(57) ABSTRACT

The invention relates to a plate heat exchanger and a method for constructing multiple passes in the plate heat exchanger. A plate heat exchanger (1) according to the invention comprises at least one stopper plate (7) arranged between the outer surface of the plate pack (6) and the shell (2) of the outer casing of the heat exchanger for arranging multiple passes for the second heat exchange medium to the heat exchanger, wherein the stopper plate (7) is welded to an additional planar structure of the plate pack.

8 Claims, 5 Drawing Sheets

(51) Int. Cl.
*F28D 9/00* (2006.01)
*B23P 15/26* (2006.01)

(58) Field of Classification Search
CPC .. F28F 2230/00; F28D 9/0037; F28D 9/0006; F28D 9/0012; F28D 9/005; F28D 19/047
USPC ........ 165/157, 159, 166; 277/640, 643, 648, 277/638, 639, 652, 616
See application file for complete search history.

(56) References Cited

U.S. PATENT DOCUMENTS

| | | | | |
|---|---|---|---|---|
| 3,628,603 | A * | 12/1971 | Fieni | F28F 9/001 165/151 |
| 4,940,080 | A * | 7/1990 | Reeves | F28D 19/047 165/9 |
| 6,340,051 | B1 * | 1/2002 | Bloksma | F28F 9/00 165/159 |
| 6,918,433 | B2 * | 7/2005 | Kontu | F28D 9/0006 165/135 |
| 7,004,237 | B2 * | 2/2006 | Mathur | F28D 9/0006 165/167 |
| 8,443,869 | B2 * | 5/2013 | Lavanchy | F28B 1/02 165/145 |
| 8,453,721 | B2 * | 6/2013 | Mathur | F28D 9/0012 165/135 |
| 8,505,923 | B2 * | 8/2013 | Ferryman | F28D 19/047 277/355 |
| 2014/0131025 | A1 * | 5/2014 | Blomgren | F28D 9/0006 165/185 |

FOREIGN PATENT DOCUMENTS

| | | | | |
|---|---|---|---|---|
| CN | 101 672 580 | | 12/2010 | |
| CN | 102620581 | | 8/2012 | |
| EP | 2136175 | A1 * | 12/2009 | ........... F28D 9/0006 |
| GB | 682861 | A * | 11/1952 | ............ F16J 15/106 |
| GB | 2 346 959 | | 8/2000 | |
| JP | S59-158986 | | 9/1984 | |
| WO | WO 02/16852 | | 2/2002 | |
| WO | WO 2004/090450 | | 10/2004 | |
| WO | WO 2011089189 | A2 * | 7/2011 | ................ F28F 7/02 |
| WO | WO 2013/072566 | | 5/2013 | |

OTHER PUBLICATIONS

International Search Report for PCT/FI2014/050089 dated May 16, 2014, three pages.
Written Opinion of the ISA for PCT/FI2014/050089 dated May 16, 2014, four pages.
FI Search Report for FI20135320 dated Jan. 9, 2014, one page.

* cited by examiner

PLATE HEAT EXCHANGER AND METHOD FOR CONSTRUCTING MULTIPLE PASSES IN THE PLATE HEAT EXCHANGER

This application is the U.S. national phase of International Application No. PCT/FI2014/050089 filed 7 Feb. 2014 which designated the U.S. and claims priority to FI Patent Application No. 20135320 filed 4 Apr. 2013, the entire contents of each of which are hereby incorporated by reference.

FIELD OF THE INVENTION

The present invention relates to a plate heat exchanger and a method for constructing multiple passes in the plate heat exchanger according to the preambles of the independent claims presented below.

BACKGROUND OF THE INVENTION

Plate and Shell type welded plate heat exchangers are previously known, which are composed of a plate pack formed by heat exchange plates and a shell surrounding it, functioning as a pressure vessel. The core of the heat exchanger is usually formed by a plate pack composed of circular heat exchange plates, where the plates have been welded tightly together at openings therein and/or at the perimeters of the plates. A primary circuit of the heat exchanger is formed between the openings in the plates and a secondary circuit between connections of the shell surrounding the plate pack, so that a heat exchange medium of the primary side flows in every other plate space and a heat exchange medium of the secondary side in every other plate space.

The performance of the heat exchanger can be improved by arranging two heat exchange mediums to pass each other several times. A heat exchanger wherein heat exchange mediums pass each other more than once is typically called a multi-pass heat exchanger. The multiple passes can be carried out e.g. by inserting stopper plates on the shell side and/or the pack side of the heat exchanger. These stopper plates direct the medium back and forth across the plate pack several times to achieve the multi-pass effect.

In heat exchangers composed of circular heat exchange plates, in which the plate pack is placed inside a cylindrical shell, it is problematic to arrange multiple passes in the secondary side inside the shell in such a way that there is no by-pass flow between the plate pack and the shell. The by-pass flow reduces efficiency of the plate heat exchanger. Moreover, the additional structures in the heat exchanger structure might weaken the pressure-tightness of the heat exchanger and so the structure of the heat exchanger has commonly been kept as simple as possible.

DESCRIPTION OF THE INVENTION

It is an object of the invention to present a plate heat exchanger construction in which multiple passes can be arranged in the shell side of the plate heat exchanger so that the by-pass flows can be eliminated, and which multi-pass construction does not affect the pressure-tightness of the heat exchanger.

It is another object of the invention to provide a plate heat exchanger construction which is easy to manufacture.

In order to achieve among others the objects presented above, a plate heat exchanger and a method for constructing multiple passes in the shell side of the plate heat exchanger according to the invention are characterised in what is presented in the enclosed independent claims.

The other, dependent claims present some preferred embodiments of the invention.

The embodiments and advantages mentioned in this text are in suitable parts applicable to both a plate heat exchanger and a method according to the invention, even if this is not always specifically mentioned.

A typical heat exchanger according to the invention comprises
  a plate pack formed by the circular heat exchange plates arranged on top of each other, and which plate pack comprises ends in the direction of the heat exchange plates and an outer surface defined by the outer edges of the heat exchange plates,
  an outer casing surrounding the plate pack, which casing comprises end plates mainly in the direction of the ends of the plate pack and a shell connecting the end plates,
  inlet and outlet connections for a first and a second heat exchange medium, which connections are arranged through the outer casing, and
  at least one stopper plate having a first edge and a second edge arranged between the plate pack and the shell of the outer casing for arranging multiple passes in the shell side of the heat exchanger, wherein the stopper plate is welded to an additional planar structure arranged between the heat exchange plates of the plate pack.

A typical method according to the invention for constructing multiple passes in the shell side of the plate heat exchanger comprises
  forming a plate pack, where the circular heat exchange plates are attached together on top of each other, whereby the plate pack has ends in the direction of the heat exchange plates and an outer surface defined by the outer edges of the heat exchange plates,
  arranging an outer casing around the plate pack, which casing comprises end plates mainly in the direction of the ends of the plate pack and a shell connecting the end plates,
  arranging inlet and outlet connections for a first and a second heat exchange medium through the outer casing,
  arranging at least one stopper plate between the plate pack and the shell of the outer casing, and
  welding the stopper plate to an additional planar structure arranged between the heat exchange plates of the plate pack.

The present invention is based on a novel construction of a multi-pass plate heat exchanger, which is manufactured by arranging a stopper plate or plates between the plate pack and the inner surface of the shell and by welding the stopper plate(s) to an additional planar structure arranged into the plate pack so that the pressure-tightness of the construction can still be ensured. The additional planar structure can be a thin extra plate or a thicker intermediate end plate, which is arranged between the heat exchange plates of the plate pack so that the outer edge of the additional planar structure is substantially in the same plane with the outer surface of the plate pack. The structure of the present invention eliminates the by-pass flow relating to the stopper plates since the present construction ensures a compact structure of the plate pack with the stopper plates by eliminating weak joining points of the multi-pass construction. When stopper plates have been welded to the additional planar structure(s) of the plate pack, the construction of the heat exchanger is also more supporting since pressure directed to the stopper plate is not directed to the plate pack.

A typical multi-pass plate heat exchanger according to a preferred embodiment comprises a cylindrical plate pack and a cylindrical outer casing surrounding it. The plate pack is made up of several plate pairs. Each plate pair is typically formed of two circular heat exchange plates that are welded together at least at their outer periphery. Each heat exchange plate has at least two openings for the flow of the first heat exchange medium. Adjacent plate pairs are attached together by welding the openings of two adjacent plate pairs to each other. Thus the first heat exchange medium can flow from a plate pair to another via the openings. The second heat exchange medium is arranged to flow inside the shell in the spaces between the plate pairs. Inlet and outlet connections for the first as well as for the second heat exchange medium have been arranged through the outer casing of the plate heat exchanger. The inlet and outlet connection of the first heat exchange medium has been arranged in connection with the inner parts of the plate pack, i.e. inner parts of the plate pairs. The primary circuit of the plate heat exchanger is thus formed between the inlet and outlet connection of the first heat exchange medium. The inlet and outlet connections for the second heat exchange medium have been arranged in connection with the inner side of the shell, i.e. with the outer side of the pack of plates. In other words, the secondary circuit of the plate heat exchanger is formed between the inlet and outlet connection of the second heat exchange medium, inside the shell, in the spaces between the plate pairs. Typically, the primary and secondary circuits are separate from each other, i.e. the first heat exchange medium flowing in the inner part of the plate pack cannot get mixed with the second heat exchange medium flowing in the shell, i.e. outside the plate pack. Thus, the first primary side heat exchange medium flows in every other plate space and the second secondary side heat exchange medium flows in every other plate space of the plate heat exchanger according to the invention.

According to an embodiment the additional planar structure arranged between the heat exchange plates of the plate pack can be a thin extra plate having a thickness of about 0.7 to 1.5 mm. The extra plate is typically a flat plate and it has the same shape as the heat exchange plates of the plate pack. The extra plate can be welded to the heat exchange plates of the plate pack from the periphery of the openings.

According to another embodiment the additional planar structure can be an intermediate end plate having a typical thickness of 5 to 20 mm, more typically about 10 to 15 mm, and most typically 10 mm, i.e. the intermediate end plate is substantially thicker than the heat exchange plates of the plate pack. According to an embodiment the plate pack comprises one or more intermediate end plates arranged into the plate pack between the heat exchange plates. The diameter of the intermediate end plate is substantially the same as the heat exchange plates of the plate pack. The outer edge of the intermediate end plate can comprise a groove or grooves which allows easy installation of the stopper plate in connection with the intermediate end plate. A part of the stopper plate can be arranged into the groove and so the stopper plate can easily be welded to the construction. The groove(s) also help the welding of the heat exchange plates to the intermediate end plate. The thickness of the stopper plate is typically 2 to 5 mm, more typically about 3 mm with the embodiment of the intermediate end plates.

According to an embodiment the plate pack comprises one or more additional planar structures arranged to the plate pack between the heat exchange plates.

The stopper plates are a substantially planar in the direction of the heat exchange plates and they are arranged to the plate heat exchanger structure in the direction of the heat exchange plates of the plate pack. The stopper plates having an inner edge and an outer edge are arranged in the plate pack construction so that the inner edge of the stopper plate is in contact with the plate pack construction. In a preferred embodiment the stopper plates are dimensioned so that they can be arranged partly inside the plate pack construction, i.e. the inner edge of the stopper plate can be arranged partly inside the plate pack or inside a groove or grooves in the edge of the intermediate end plate. The stopper plates may be welded from the area of their inner edge to the additional planar structure, such as a thin extra plate or an intermediate end plate, for ensuring a tight and supporting structure, wherein a weld is arranged to the joining point of the additional plate structure and the stopper plate. The additional planar structure also allows easy manufacturing of the passes in the heat exchanger, i.e. the welding of the stopper plates to the plate pack construction can be carried out easily.

An embodiment of the plate heat exchanger comprises a stopper plate construction between the shell and the plate pack, which construction comprises two plates arranged at a distance from one another and a sealing, such as a rubber sealing, between the plates. The plates are welded to the extra plate, for example the inner edges of the plates of the construction are welded to the extra plates arranged between the heat exchange plates of the plate pack. The sealing is arranged to be pressed against the inner surface of the outer shell and against the outer surface of the plate pack between the plates of the stopper plate for preventing by-pass flows. The sealing is dimensioned to fit tightly between the plates. The width of the stopper plate in the cross direction of the heat exchanger is dimensioned so that the outer edge of the stopper plate does not touch the inner surface of the outer shell in any point. The thickness of the stopper plates is typically 1 to 3 mm, more typically about 2 mm with the embodiment of the extra plate(s) arranged into the plate pack. The stopper plate construction with two plates and the sealing is arranged in the construction so that it covers several plate spaces of the plate pack, typically 2 to 5 plate spaces, more typically three plate spaces.

In an embodiment, the multiple passes of the heat exchanger are carried out by using an internal tube structure, additional planar structures and stopper plates. A plate heat exchanger can comprise two internal tube structures, being preferably arranged on opposite sides of the plate pack. The heat exchange medium flows inside the internal tube structure. The inner edge of the stopper plate is welded to the additional planar structure and an outer edge of the stopper plate is welded to the internal tube structure, wherein the formed construction is tight. The length of the internal tube structure in the longitudinal direction of the plate pack can be different on opposite sides of the plate pack. Between the internal tube structures can be arranged the flow guides of the plate heat exchanger, which flow guides are arranged to extend from one end of the plate pack to the other end of the plate pack in the length direction of the plate pack. The stopper plate can be arranged to the construction so that the stopper plate also overlaps partly the flow guides in the direction of the heat exchange plates wherein the by-pass flow can be eliminated efficiently. The stopper plate construction with internal tubes is completely welded structure.

A typical heat exchanger according to the invention comprises flow guides, which are arranged on opposite sides of the plate pack, and which flow guides can be arranged to extend from one end of the plate pack to the other end of the plate pack in the length direction of the plate pack. Typically, the stopper plate(s) has a curved shape corresponding to the shape of the outer surface of the plate pack, and the stopper plate(s) extends in the direction of the heat exchange plates at least from one flow guide to another flow guide. According to an embodiment the stopper plate has a curved shape and it has a length of about ½ to ¾ of the overall diameter of the plate pack, i.e. the stopper plate circulates about ½ to ¾ of the overall diameter of the plate pack. Since the stopper plates circulate about ¾ of the overall diameter of the plate pack, the stopper plate is also arranged to overlap partly the flow guides in the direction of the heat exchange plates. In a typical embodiment the stopper plate is shaped so that it can be arranged partly below the flow guides. By using this kind of construction, the by-pass flow can be efficiently eliminated since a non-sealed point between flow guide and the end of the stopper plate has been eliminated. Typically, the plate heat exchanger comprises two flow guides in the direction of the length of the plate pack, arranged on opposite sides of the plate pack. The first end and the second end of the stopper plate and the edges of the flow guide are arranged tightly against each other, and they can be welded to each other. The length of the stopper plate depends on the size of the plate pack.

The additional planar structures also make it possible to arrange multiple passes to the pack side of the heat exchanger so that a required number of the additional planar structures are arranged into the plate pack, wherein the additional planar structures comprise an opening for allowing a flow in the flow channel of the plate pack or the plate is unbroken for closing the flow channel (i.e. an opening of the heat exchange plate). Typically, the additional planar structure allows flow in one flow channel of the plate pack and closes the other flow channel of the plate pack.

In a typical embodiment one, two or more stopper plates extended in the direction of the heat exchange plates are arranged in the plate pack construction. In an embodiment two or more stopper plates are arranged on opposite sides of the plate pack. The number of the stopper plates is dependent on the desired construction and the required heat transfer efficiency, which is achieved with multiple passes. The location of the stopper plates can be freely selected, whereby it is possible to alter the heat exchange surface area of the plate pack used by the heat exchange medium.

BRIEF DESCRIPTION OF THE DRAWINGS

In the following, the invention will be described in more detail with reference to the appended schematic drawings, in which.

DETAILED DESCRIPTION OF THE DRAWINGS

In FIGS. 1 to 8, the same reference numbers have been used for parts corresponding to each other, even though the parts marked with the same reference numbers can be different in different examples.

Figure 1:
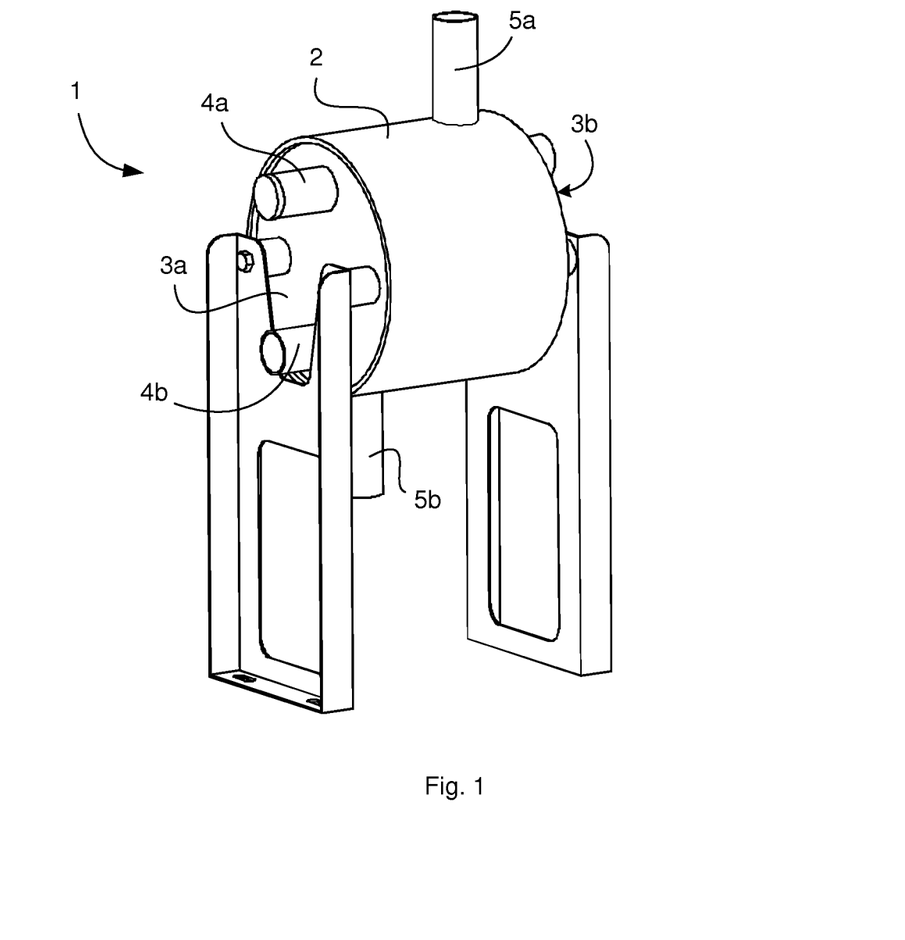
FIG. 1 shows a heat exchanger according to the invention.

FIG. 1 presents as an example a heat exchanger according to the invention seen from the outside. The heat exchanger 1 has a cylindrical outer casing functioning as a pressure vessel, which comprises a shell 2 and end plates 3a, 3b. A plate pack (not shown in the figure) arranged inside the heat exchanger is attached between the end plates.

In FIG. 1 inlet and outlet connections 4a, 4b for a first heat exchange medium (i.e. a flow of the pack side) have been arranged through the end plate of the heat exchanger, and inlet and outlet connections 5a, 5b for a second heat exchange medium (i.e. a flow of the shell side) have been arranged through the shell 2 of the heat exchanger. The connections are advantageously welded to the outer casing of the heat exchanger.

Figure 2:
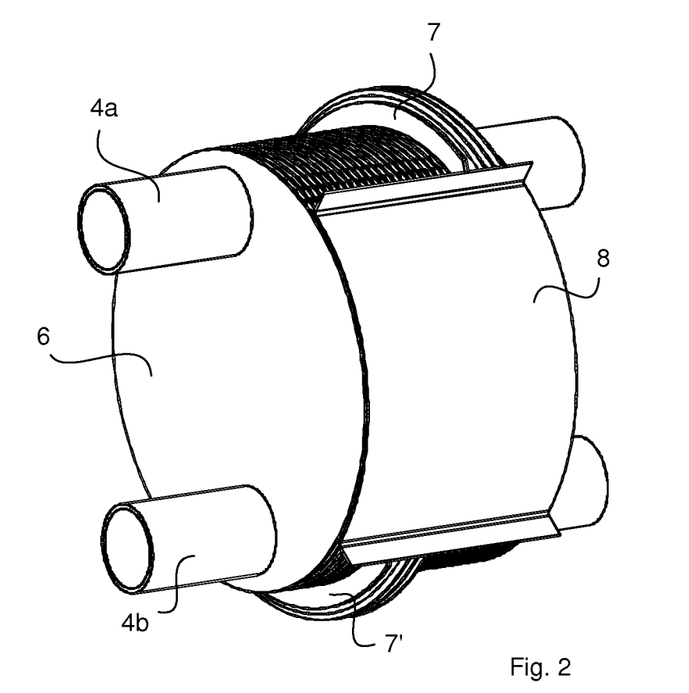
FIG. 2 shows a plate pack with stopper plates of a plate heat exchanger according to an embodiment.

FIG. 2 shows a plate pack 6 of a plate heat exchanger according to an embodiment and stopper plates 7, 7' which are welded to the plate pack construction on opposite sides of the plate pack 6 for forming multiple passes to the plate pack. Flow guides 8 have been arranged between the stopper plates on opposite sides of the plate pack (only one flow guide is shown in the figure).

Figure 3:
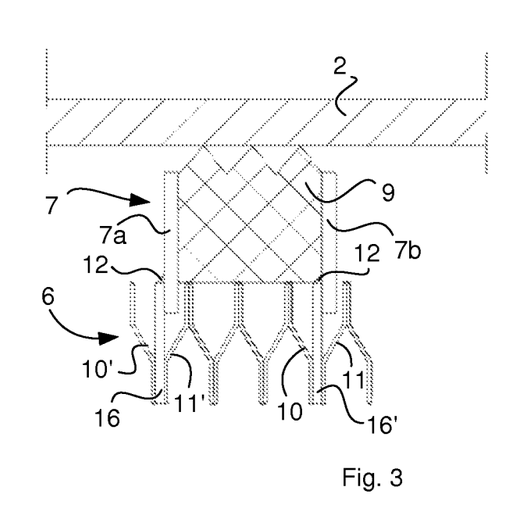
FIG. 3 shows a cross-section of the stopper plate construction with extra plates arranged between the heat exchange plates of the plate pack according to an embodiment.

FIG. 3 presents a cross-section of the stopper plate construction with extra plates 16, 16' arranged between the heat exchange plates 10, 11, 10', 11' of the plate pack 6 according to an embodiment. The stopper plate construction 7 comprises plates 7a and 7b arranged at a distance from one another and a sealing 9 between the plates 7a, 7b. The plates 7a, 7b are welded to the extra plates 16, 16' arranged between the heat exchange plates of the plate pack. The welding joint 12 between the plates 7a, 7b and the extra plates 16, 16' is in the outer surface of the plate pack. The sealing 9 is arranged to be pressed against the inner surface of the outer shell 2 and against the outer surface of the plate pack 6 between the plates 7a, 7b forming the stopper plate.

Figure 4:
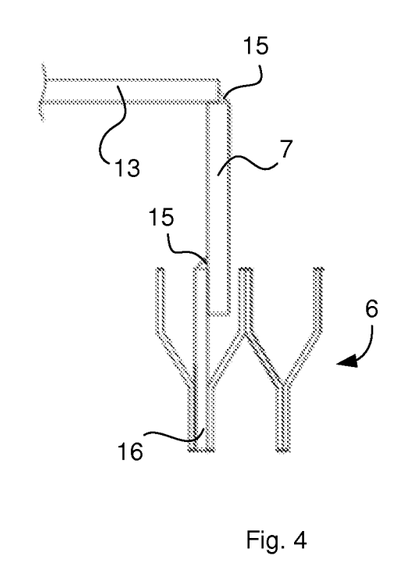
FIG. 4 shows a detailed cross-section of a stopper plate with internal tube construction according to an embodiment.

FIG. 4 presents a cross-section of a stopper plate 7 with internal tube construction 13 and an extra plate 16 according to an embodiment. The inner edge of the stopper plate 7 is arranged in contact with the extra plate 16. The internal tube structure 13 is welded to the outer edge of the stopper plate 7. Welding joints 15 are also shown in FIG. 4.

Figure 5:
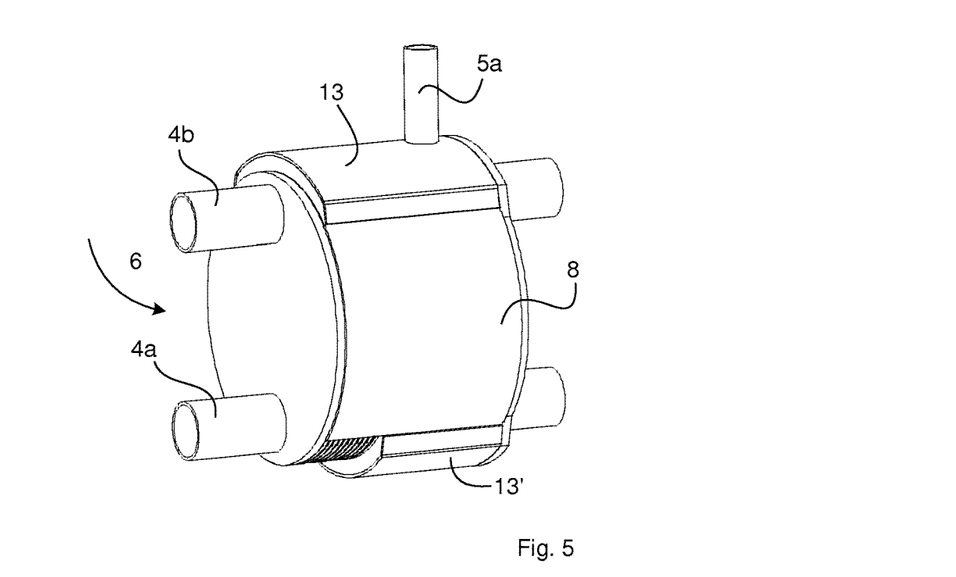
FIG. 5 shows a plate pack with internal tube structure of the plate heat exchanger according to an embodiment.
Figure 6:
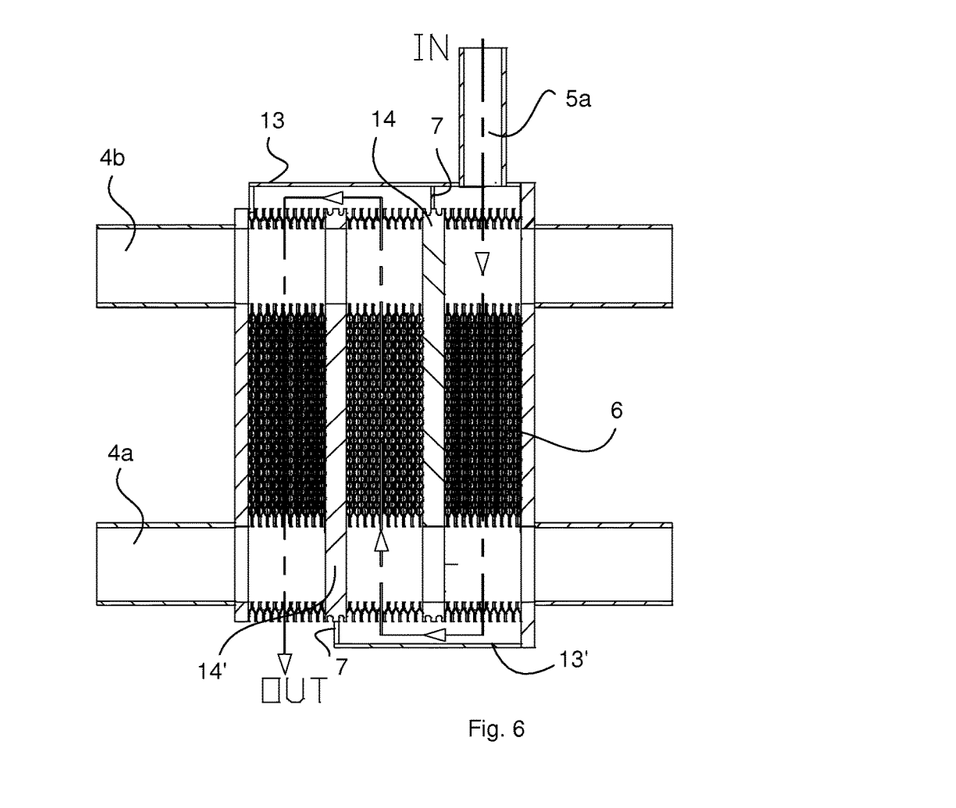
FIG. 6 shows a cross-section of the plate pack of the plate heat exchanger according to FIG. 5.
Figure 7:
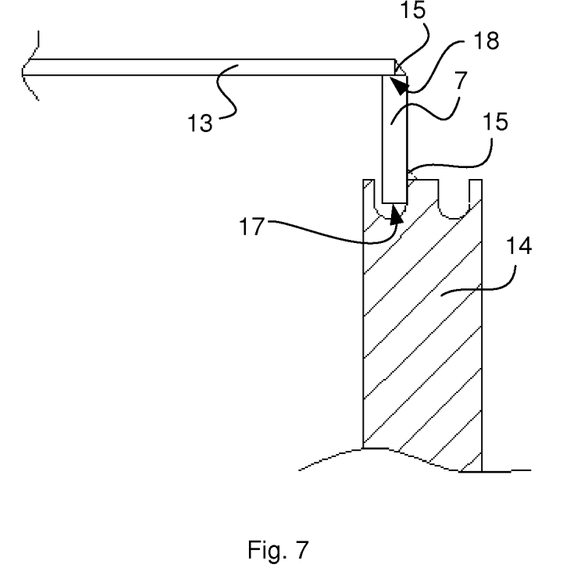
FIG. 7 shows a detailed cross-section of the stopper plate construction of FIG. 5.

FIGS. 5 to 7 show another embodiment in which multiple passes are arranged in the plate heat exchanger by using internal tube structures 13, 13', intermediate end plates 14, 14' and stopper plates 7.

FIG. 5 shows a plate pack 6 of the plate heat exchanger, internal tube structures 13, 13' arranged on opposite sides of the plate pack, and flow guides 8 (only one flow guide is shown in the figure) arranged between the internal tubes on the outer surface of the plate pack. FIG. 6 shows the cross-section of a heat exchanger according to FIG. 5. The stopper plate 7 for constructing multiple passes inside the internal tube structure is arranged between the plate pack 6 and the internal tube 13 so that the inner edge of the stopper plate is welded to the intermediate end plate and the outer edge of the stopper plate is welded to the internal tube structure 13, 13'. Intermediate end plates 14, 14' comprise required openings for forming multiple passes on the pack side of the heat exchanger.

The intermediate end plate 14 comprises a groove or grooves in the outer edge of the plate as shown in FIG. 7. The inner edge 17 of the stopper plate 7 is arranged in this groove and so a welding joint 15 can be arranged in the outer surface of the intermediate end plate. The internal tube structure 13 is welded to the outer edge 18 of the stopper plate 7.

Figure 8:
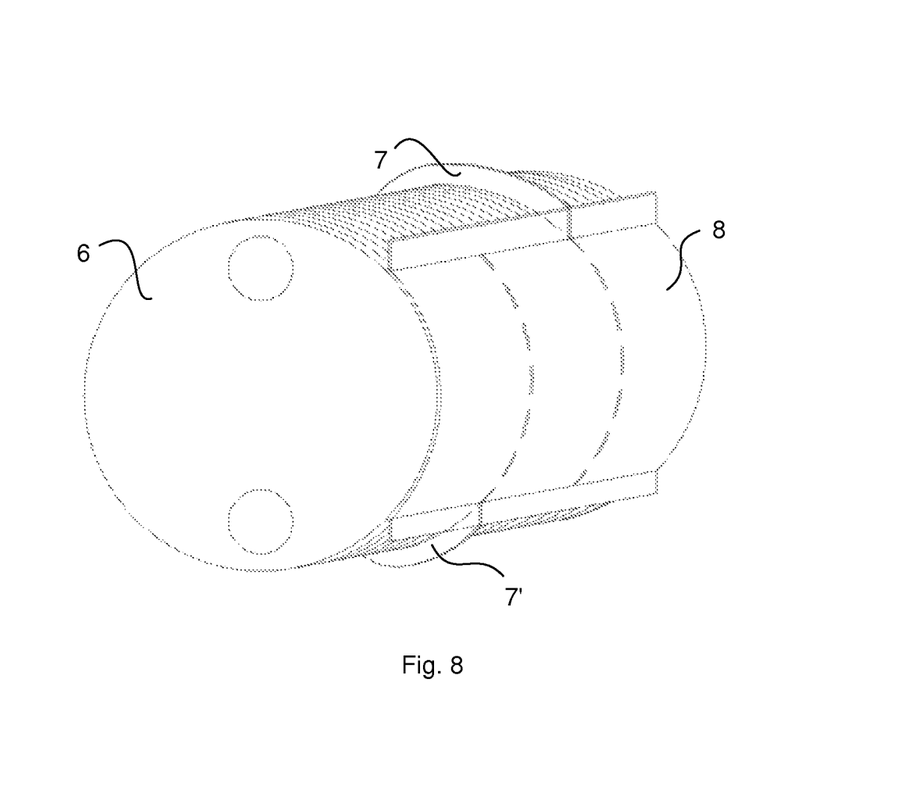
FIG. 8 shows a plate pack with a flow guide and stopper plates according to an embodiment.

FIG. 8 illustrates an embodiment in which the by-pass flow in the joining point of the stopper plate and an edge of the flow guide has been eliminated. Stopper plates 7, 7' are arranged to the plate pack construction so that the stopper plate 7, 7' also extends to at least the part of the length of the flow guides 8, i.e. the stopper plate can continue below the flow guide 8 (only one of the flow guides arranged on opposite side of the plate pack is shown in Figure). According to an embodiment the stopper plates 7, 7' can circulate about ½ to ¾ of the length of the outer surface of the plate pack.

Many variations of the present invention will suggest themselves to those skilled in the art in light of the above detailed description. Such obvious variations are within the full intended scope of the appended claims.

The invention claimed is:

1. A plate heat exchanger comprising:
   a plate pack comprised of a stack of circular heat exchange plates which are positionally arranged on top of each other, wherein the plate pack comprises opposed first and second ends in a longitudinal direction of the stack of heat exchange plates and an outer peripheral surface defined by outer edges of the heat exchange plates,
   an outer casing surrounding the plate pack, wherein the outer casing comprises (i) a cylindrical shell having an inner surface which defines an interior space of the outer casing for internally housing the plate pack, and (ii) opposed end plates each being connected to the shell adjacent to the first and second ends of the plate pack, respectively,
   inlet and outlet connections through the outer casing to allow for a first and a second heat exchange medium, and
   at least one stopper plate assembly arranged between the plate pack and the shell of the outer casing to establish multiple passes within the shell of the heat exchanger, wherein the at least one stopper plate assembly comprises:
   (i) first and second additional planar plate structures being positioned between respective first and second adjacent pairs of the heat exchange plates of the plate pack which are spaced apart from one another in the longitudinal direction of the stack of heat exchange plates,
   (ii) first and second stopper plate members respectively welded to the first and second additional planar plate structures so as to extend outwardly from the plate pack beyond the peripheral surface of the stack of heat exchange plates toward the inner surface of the shell and thereby define a stopper space therebetween, and
   (iii) a seal member positioned within the stopper space defined between the first and second stopper plate members, the seal member being sealingly pressed against the peripheral surface of the stack of heat exchange plates and the inner surface of the shell.

2. The plate heat exchanger according to claim 1, wherein each of the first and second additional planar plate structures is positioned between the respective first and second adjacent pairs of the heat exchange plates so that outer edges of the first and second additional planar plate structures are substantially in a common plane with the outer peripheral surface of the plate pack.

3. The plate heat exchanger according to claim 1, wherein each of the first and second stopper plate members has an inner edge which is arranged so as to be positioned partly inside the outer surface of the plate pack.

4. The plate heat exchanger according to claim 1, wherein the plate pack comprises multiple stopper plate assemblies which are spaced apart from one another in the longitudinal direction of the plate pack.

5. The plate heat exchanger according to claim 4, wherein at least two of the multiple stopper plate assemblies are arranged on opposite sides of the plate pack.

6. The plate heat exchanger according to claim 2, wherein each of the first and second additional planar plate structures has a thickness between 0.7 to 1.5 mm.

7. The plate heat exchanger according to claim 3, wherein the inner edge of each of the first and second stopper plate members is connected to an outer edge of the respective first and second additional planar plate structures at a weld joint.

8. The plate heat exchanger according to claim 7, wherein the weld joint is positioned at the outer peripheral surface of the plate pack.

* * * * *